UNITED STATES PATENT OFFICE.

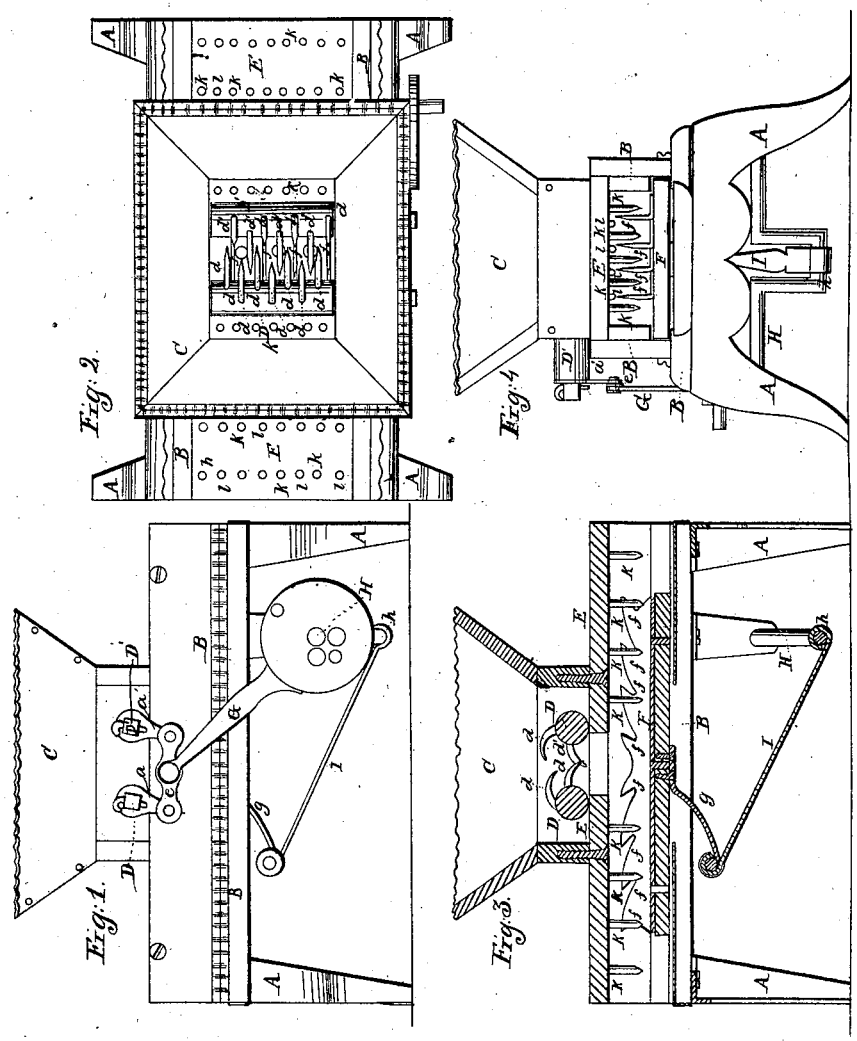

A. A. WOOD, OF JERSEY CITY, NEW JERSEY.

MACHINE FOR PICKING COP-WASTE.

Specification of Letters Patent No. 20,677, dated June 22, 1858.

*To all whom it may concern:*

Be it known that I, ALBERT A. WOOD, of Jersey City, in the county of Hudson and State of New Jersey, have invented an Improvement in Machines for Picking Cop-Waste and other Like Substances, the construction and operation of which I have described in the following specification and illustrated in the accompanying drawings with sufficient clearness to enable competent and skilful workmen in the arts to which it pertains or is most nearly allied to make and use my invention.

My said invention consists in the combination described of a reciprocating toothed bed with vibrating toothed feeding rollers or their equivalent and with a stationary toothed cover when the teeth are constructed and arranged in reference to each other in the manner described and shown to pass the waste or cotton through the machine and open it without seriously rending the fiber as hereinafter more fully set forth.

In the accompanying drawings, Figure 1 is a side elevation of my improved machine. Fig. 2 is a plan of it. Fig. 3 is a vertical longitudinal section. Fig. 4 is an end view.

A A are the legs and B is the frame of the machine. C is the hopper in which the waste to be picked is placed and from which it is fed by the toothed rollers D, D', through the cover E down upon the teeth attached to the bed F. It will be observed that these rollers D D' are armed with long sharp teeth $d$, $d'$, which teeth are so curved as to gather the waste upon them when they have a downward motion given them and to allow it to slide from them when they are raised. The rollers or shafts D, D', have cranks $a$, $a'$ attached to them by means of which they may be vibrated, and to secure the upward motion of the teeth $d$ at the same time that the teeth $d'$ are descending and vice versa, I couple these cranks $a$, $a'$ together by the connecting rod $e'$, which receives motion from the rod G, and this is operated by an eccentric upon the main shaft H. The vibration of these rollers feeds the waste down upon the reciprocating bed F and at the same time partially opens it, thus not only regulating the feed of the stuff, but also commencing the operation of picking it. From these rollers it is delivered upon the teeth $f$ which are attached to the bed F. These teeth are arranged in rows as shown in Fig. 4 and are so inclined as to gather the waste downward and outward toward the ends of the machine as shown in Fig. 3. The rotation of the main shaft H gives a reciprocating motion to the bed F by means of the crank $h$ and the connecting rod I one end of which is attached to the brace $g$. This brace $g$ is firmly attached to the bed. The action of the teeth $f$ draws the waste against the teeth $k$ which are attached to the cover E and extend downward between the teeth $f$, their points coming down nearly to the bed. As the waste is brought down by the feeding teeth $d$, $d'$, a part of it is drawn in one direction and a part of it in the other by alternate strokes of the bed F and this division of the stuff also helps to open it. As it is moved outward by each stroke of the bed, the teeth $f$ bring it in contact with the teeth $k$ which also open it by their resistance to its outward motion. As the teeth $f$ are withdrawn by the return strokes of the bed they slide back under the waste, which is kept from returning by the teeth $k$ assisted by the short teeth $l$ which are placed between them. The form of the teeth $f$ is such as to gather the waste upon them as they move outward and also to slide very freely under it as they are drawn back. Their form is very clearly shown in the drawings. The main shaft should be run at the rate of about 120 revolutions per minute.

The particular improvement which constitutes my said invention and which I claim as having been originally and first invented by me is, The combination described of a reciprocating toothed bed with vibrating toothed feeding rollers or their equivalent and with a stationary toothed cover when the teeth are constructed and arranged in reference to each other in the manner described and shown, to pass the waste or cotton through the machine without seriously rending the fiber and at the same time securing a precise and even feed to the bed by the combination of the vibrating toothed rollers working at a corresponding speed as set forth.

ALBERT A. WOOD.

Witnesses:
JAS. H. GRIDLEY,
THOS. P. HOW.